US006336422B1

(12) United States Patent
Peters

(10) Patent No.: US 6,336,422 B1
(45) Date of Patent: Jan. 8, 2002

(54) FULL TANK MARKER

(76) Inventor: Archie G. Peters, 4396 N. Genesee Rd., Flint, MI (US) 48506

( * ) Notice: Subject to any disclaimer, the term of this patent is extended or adjusted under 35 U.S.C. 154(b) by 0 days.

(21) Appl. No.: 08/558,866

(22) Filed: Nov. 15, 1995

Related U.S. Application Data

(63) Continuation of application No. 08/158,383, filed on Nov. 29, 1993, now abandoned.

(51) Int. Cl.[7] .......................... G01D 13/00; G09F 3/04
(52) U.S. Cl. .......................... 116/200; 40/310
(58) Field of Search .......................... 40/299, 310, 306, 40/316, 322, 332, 663, 665; 116/200; 292/307 R, 307 A, 307 B, 320, 324, 331; 220/724

(56) References Cited

U.S. PATENT DOCUMENTS 210,001 A * 11/1878 Anderson .................... 40/663
478,185 A * 7/1892 Barnum .................... 40/663
1,509,925 A * 9/1924 Bostwick .................... 292/307 R
2,703,546 A 3/1955 Allen .................... 116/200
3,513,801 A 5/1970 Osorio .................... 116/200
3,787,993 A * 1/1974 Lyon .................... 40/306
4,058,081 A 11/1977 Maxfield .................... 116/200
4,318,495 A * 3/1982 Wood .................... 220/724 X
4,827,643 A * 5/1989 Hearst et al. .................... 220/724 X
5,191,992 A * 3/1993 Darley .................... 220/724 X

* cited by examiner

*Primary Examiner*—Daniel S. Larkin
*Assistant Examiner*—Willie Morris Worth
(74) *Attorney, Agent, or Firm*—Henry S. Miller

(57) ABSTRACT

An indicating device, for a pressurized tank having a slotted cap covering a valve attached to the tank, has a flexible arcuate bifurcated body member. The flexible arcuate bifurcated body member has a first arm member and a second arm member forming a retaining slot and a retaining slot entrance channel. A flexible insertion handle member attaches to the flexible arcuate bifurcated body member. There is a first locking surface on the flexible arcuate bifurcated body member and a second locking surface on the flexible arcuate bifurcated body member. A first guide member is attached to the first arm member and a second guide member is attached to the second arm member. There may be a first deflection surface on the first guide member and a second deflection surface on the second guide member. There may be at least one indicia application surface on the flexible insertion handle member.

1 Claim, 1 Drawing Sheet

FULL TANK MARKER

This is a continuation of application Ser. No. 08/158,383 filed on Nov. 29, 1993, now abandoned.

BACKGROUND OF THE INVENTION

1. Field of the Invention

This invention relates to an indicating device to indicate that the tank of gaseous matter to which the device is attached is "FULL". In many instances a person who is charged with selecting a tank from which gas is to be drawn, has very little time to attach a gauge to the tank to determine whether or not the tank is "FULL" or "EMPTY". Selecting an empty or partially filled tank could be costly or even dangerous. The marker may be color-coded per industry standards to indicate the contents of the tank to which it is attached.

2. Description of the Related Art

U.S. Pat. No. 2,703,546 to S. E. Allen on Mar. 08, 1955 for a Fire Extinguisher Discharge Indicator describes a rectangular tag that is torn when the extinguisher is put into operation.

U.S. Pat. No. 3,513,801 to G. Osorio on May 26, 1970 for an Anti-tampering Device shows an element having a break-away portion that whose integrity is destroyed when some-one attempts to put a fire extinguisher into operation.

U.S. Pat. No. 4,058,081 to M. A. Maxfield on Nov. 15, 1977 for a Full Tank Marker describes a protective body, covering the valve on a tank, that must be removed before the valve can be operated, There is a sign on the protective body that indicates that the tank to which the protective body is attached is full.

SUMMARY OF THE INVENTION

The Full Tank Marker shows at a glance that the pressurized gas cylinder is fully charged. This is to reduce the need to check the amount of gas in the tank by weighing or gauging. Users of the tanks can select a tank for use or determine quickly which tanks in a group are full when taking inventory of their stock. The Full Tank Marker could be made of a paper-like material but is preferably made of a thin flexible plastic material which allows it to be inserted into the slotted cap usually found on a gas cylinder. The marker is secured around the valve and locked within the cap. The composition and structure of the marker is such that when someone attempts to remove the tag or cap from a full cylinder to which the marker is attached, the marker tears warning the next user of that tank that the tank may not be "FULL". If carefully removed, a knowledgeable user may utilize the tag again. The Marker may be color-coded to indicate the type of gas contained in the tank and may have indicia on the handle or tab that protrudes from the cap indicting that the tank is full or it may provide other information.

A first embodiment of an indicating device, for a pressurized tank having a slotted cap covering a valve attached to the tank, has a bifurcated body member forming a retaining slot and a retaining slot entrance channel. There is a locking surface on the bifurcated body member and an insertion handle member attached to the locking surface.

A second embodiment of the indicating device, for a pressurized tank having a slotted cap covering a valve attached to the tank, is described herein and has an arcuate bifurcated body member forming a retaining slot and a retaining slot entrance channel. An insertion handle member is attached to the arcuate bifurcated body member and there is at least one locking surface on the arcuate bifurcated body member.

It is an object of this invention to provide a Full Tank Marker that will indicate to users of pressurized tanks which tank is "FULL" by just glancing at the marker that is inserted through the slots of the tank cap and releasably locked therein.

DESCRIPTION OF THE PREFERRED EMBODIMENTS

Figure 3:
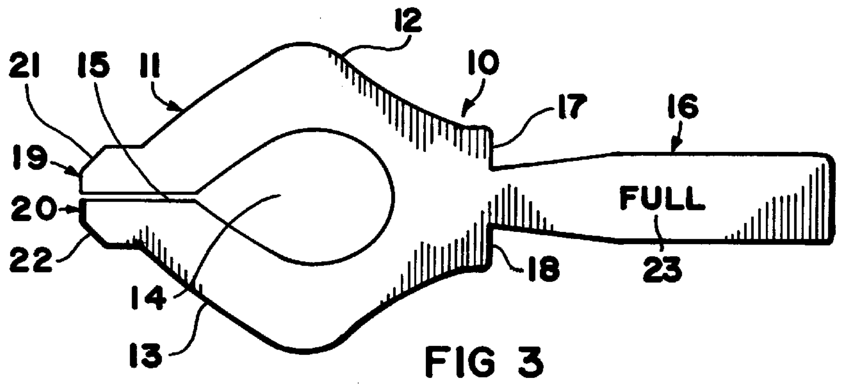
FIG. 3 is a top plan view of the Full Tank Marker; the bottom plan view being a mirror image thereof.
Figure 1:
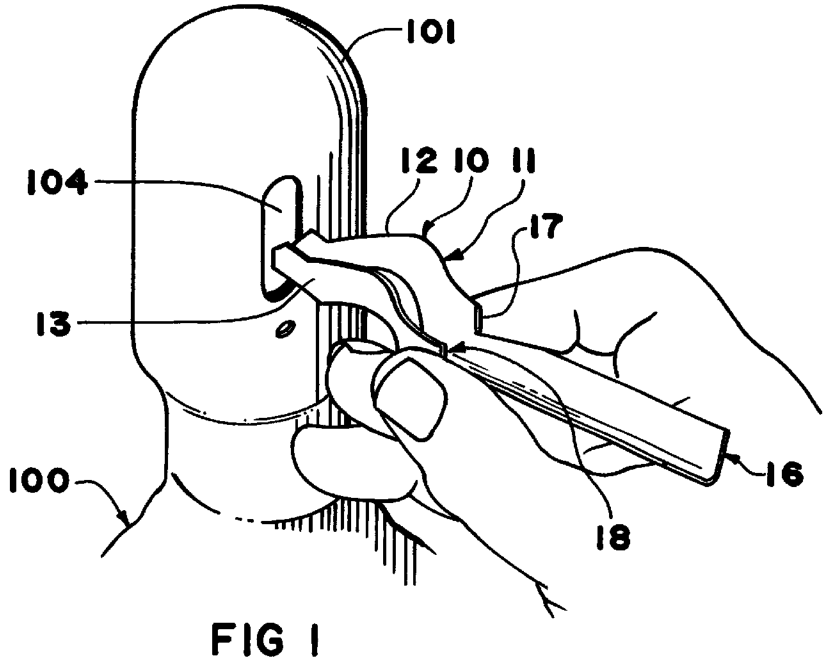
FIG. 1 shows a perspective view of a partial tank having a cap. A perspective view of a Full Tank Marker, slightly bent for ease of insertion, is shown being inserted into the slots of the cap of a full tank.
Figure 2:
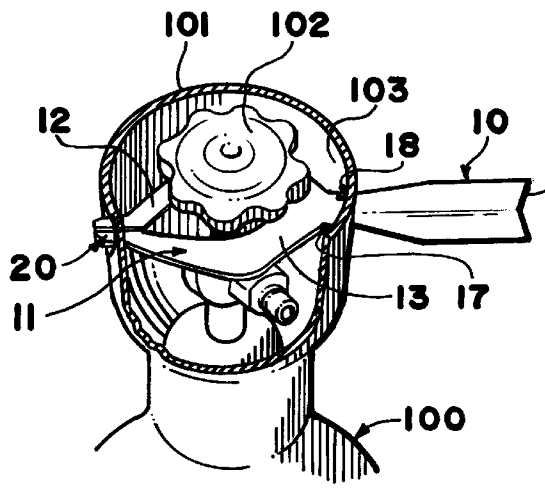
FIG. 2 is a perspective view of a cap attached to a tank, the cap having a cutaway section, showing a Full Tank Marker inserted into the cap and positioned around a valve of the tank.
Figure 4:
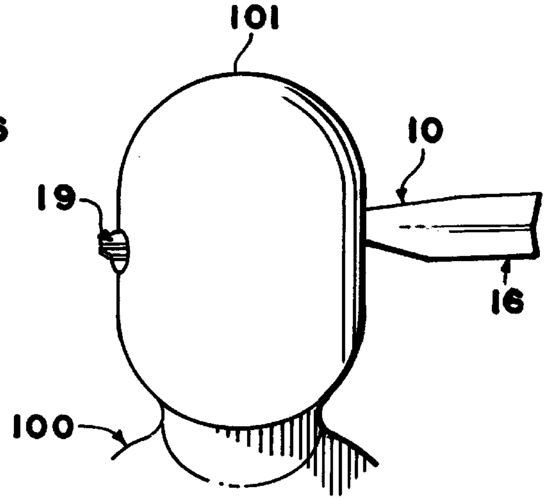
FIG. 4 is a perspective view of a cap attached to a tank showing the Full Tank Marker inserted into the cap to indicate that the tank to which the marker is attached is "FULL".

Referring to FIGS. 1 through 4, an indicating device 10, for a pressurized tank 100 having a slotted cap 101 covering a valve 102 attached to the tank 100, is shown that has a flexible arcuate bifurcated body member 11. The flexible arcuate bifurcated body member 11 has a first arm member 12 and a second arm member 13 forming a retaining slot 14 and a retaining slot entrance channel 15. A flexible insertion handle member 16 attaches to the flexible arcuate bifurcated body member 11. There is a first locking surface 17 on the flexible arcuate bifurcated body member 11 and a second locking surface 18 on the flexible arcuate bifurcated body member 11. A first guide member 19 is attached to the first arm member 12 and a second guide member 20 is attached to the second arm member 13.

There may be a first deflection surface 21 on the first guide member 19 and a second deflection surface 22 on the second guide member 20. There may be at least one indicia application surface 23 on the flexible insertion handle member 16. The first locking surface 17 may releasably lock on an inner surface 103 of the slotted cap 101 of the pressurized tank 100 and the second locking surface 18 may releasably lock on the inner surface 103 of the slotted cap 101 of the pressurized tank 100.

In operation, The Full Tank Marker or indicating device 10 usually has a one time use. A tank 100 is filled with pressurized gas, the slotted cap 101 is screwed onto the tank 100 and the Full Tank Marker 10 is folded in approximately the center lengthwise (see FIG. 1) and inserted through one of the slots 104 in the cap 101. The marker 10 is allowed to unfold and the valve 102 of the tank is allowed to pass through the retaining slot entrance channel 15 and enter the retaining slot 14. As the valve enters the retaining slot, the deflection surfaces 21 and 22 of the first and second guide members 19 and 20 contact the inside entrance of the opposing slot 104 in the cap and facilitate the passage of the first and second guide members through the opposing slot. At this time, the marker 10 comes to rest having the first and second guide members resting in the opposing slot and having the first and second locking surfaces 17 and 18 abutting or locking on the inside surface 103 of the cap 101. This serves to reduce the chance that the marker will be removed from its inserted position without tearing the marker. A torn marker serves to alert the person intending to utilize the tank that the selected tank may not be "FULL".

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An indicating device for use with a pressurized tank having a slotted cap covering a valve attached to the tank and said cap having an inner surface, comprising:

(a) a flat flexible arcuate bifurcated body member having a first arm member and a second arm member forming a retaining slot and a retaining slot entrance channel;

(b) a flat flexible insertion handle member attached to the center of a proximal end of the flexible arcuate bifurcated body member;

(c) a first locking surface on a first side of the proximal end of the flexible arcuate bifuircated body member, releasably locking on an inner surface of the slotted cap;

(d) a second locking surface on a second side of the proximal end of the flexible arcuate bifurcated body member, releasably locking on an inner surface of the slotted cap;

(e) a first flat guide member attached to the first arm member;

(f) a first deflection surface on the first guide member;

(g) a second flat guide member attached to the second arm member;

(h) a second deflection surface on the second guide member and, (i) at least one indicia application surface on the flexible insertion handle member.

* * * * *